Nov. 11, 1924.

A. P. LOFSTRAND 1,515,396

GRAIN SHOCKER

Filed Jan. 19, 1921

INVENTOR.
A.P. LOFSTRAND.

Geo. P. Kimmel
ATTORNEY.

Patented Nov. 11, 1924.

1,515,396

UNITED STATES PATENT OFFICE.

ALBIN PAULUS LOFSTRAND, OF BUFFALO, NEW YORK.

GRAIN SHOCKER.

Application filed January 19, 1921. Serial No. 438,387.

*To all whom it may concern:*

Be it known that I, ALBIN PAULUS LOFSTRAND, a citizen of the United States, residing at Buffalo, in the county of Erie and State of New York, have invented certain new and useful Improvements in Grain Shockers, of which the following is a specification.

This invention relates to an apparatus for arranging bundles of grain when delivered from a harvester and binder into shocks, commonly known as shockers, and has for one of its objects to improve the construction and increase the efficiency and utility of devices of this character.

Another object of this invention is to provide a device of this character provided with means whereby the bundle receiving and carrying mechanism is adjustable to conform to irregular conditions of the ground over which the apparatus is moved.

Another object of the invention is to provide a device of this character having means whereby the bound bundles are arranged in circular form to provide for free air circulation.

Another object of the invention is to provide a device of this character having a receiving cage or shell in which a sufficient number of bundles to form a shock are received, and means for moving said cage from a receiving to a discharging position, and adjustable to maintain the cage in a vertical position regardless of the condition of the ground over which the apparatus is moved.

Another object of the invention is to provide a device of this character having means for automatically checking the motion of the feeding mechanism while the bundles which are to form the shock are being discharged from the receiver.

Another object of the invention is to provide a device of this character having means whereby the bundles which form the shock are arranged substantially in a circle and leaning toward the center to provide an open central space within the shock for the free circulation of air.

Another object of the invention is to provide a device of this character having means whereby the bundle holding cage after the bundles have been discharged therefrom is maintained in a stationary position within the apparatus until the same has been moved forward a sufficient distance to clear the cage from the shock before it is returned to its receiving position.

With these and other objects in view, the invention consists in certain novel features of construction as hereinafter shown and described and then specifically pointed out in the claims, and in the drawings illustrative of the preferred embodiment of the invention.

Fig. 3 is a front elevation.

The improved apparatus is designed to be coupled to a grain harvester and binder and to move over the field therewith, and has an elevating apparatus coacting with the binder chute to receive the bundles from the binder and convey them to the shock receiving cage or carrier. The improved apparatus is provided with an independent traction wheel whereby the shock receiving and discharging mechanism is operated independently of the traction wheels of the harvester and binder. The improved apparatus is likewise provided with adjustable caster wheels whereby the apparatus may be moved independently of the harvester and binder when detached therefrom.

The improved apparatus is supported by a main frame substantially in U-shape and including spaced sides 10, 11 and a transverse forward member 12, leaving the rear portion open and unobstructed. The frame is preferably constructed from a single piece of channel steel, as shown, as light as possible consistent with the strains to which it will be subjected when in use. At their rear ends, the side portions 10, 11 have an upwardly arching frame including spaced vertical side portions 13, 14 and a transverse upwardly curved portion 15. The arching frame thus supports the sides 10, 11 and prevents them from being distended.

Figures 1, 25:
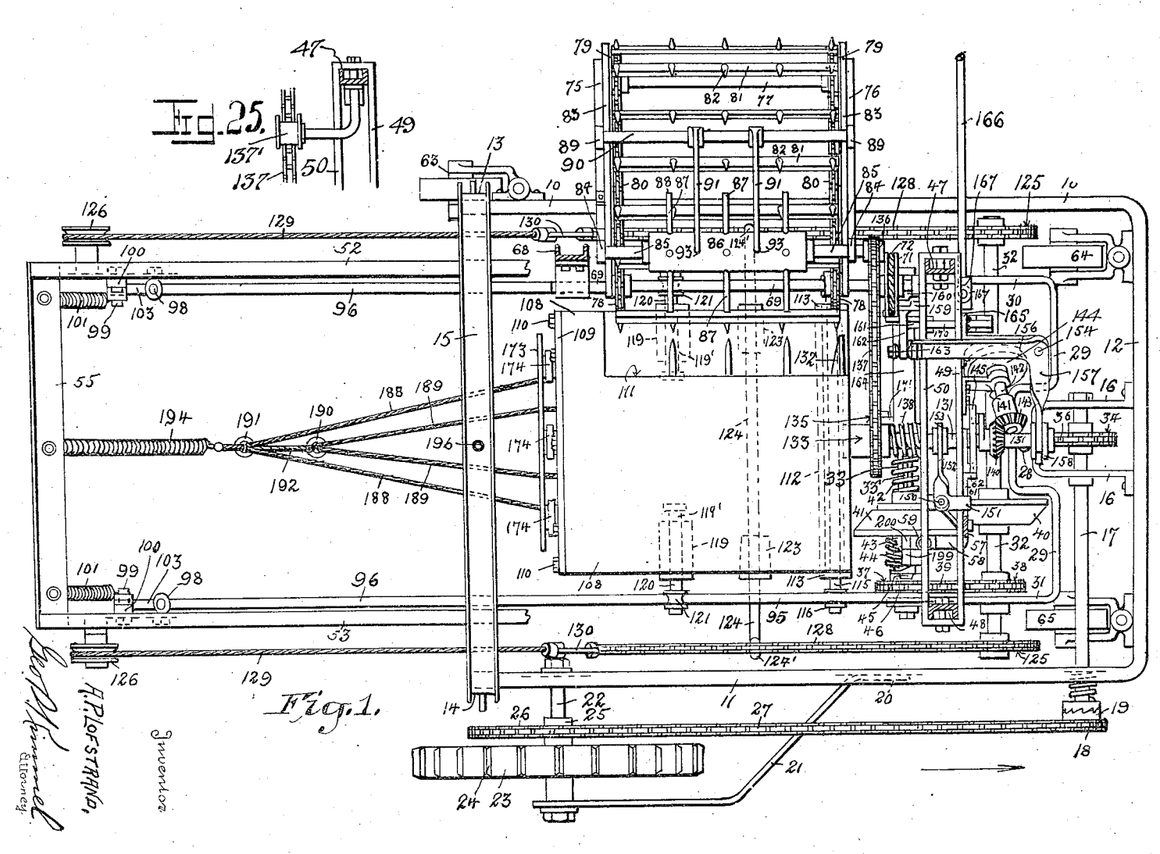
Figure 1 is a plan view of the improved apparatus.
Fig. 25 is a detached detail illustrating the construction of the idler pulley chain tightener.
Figure 2:
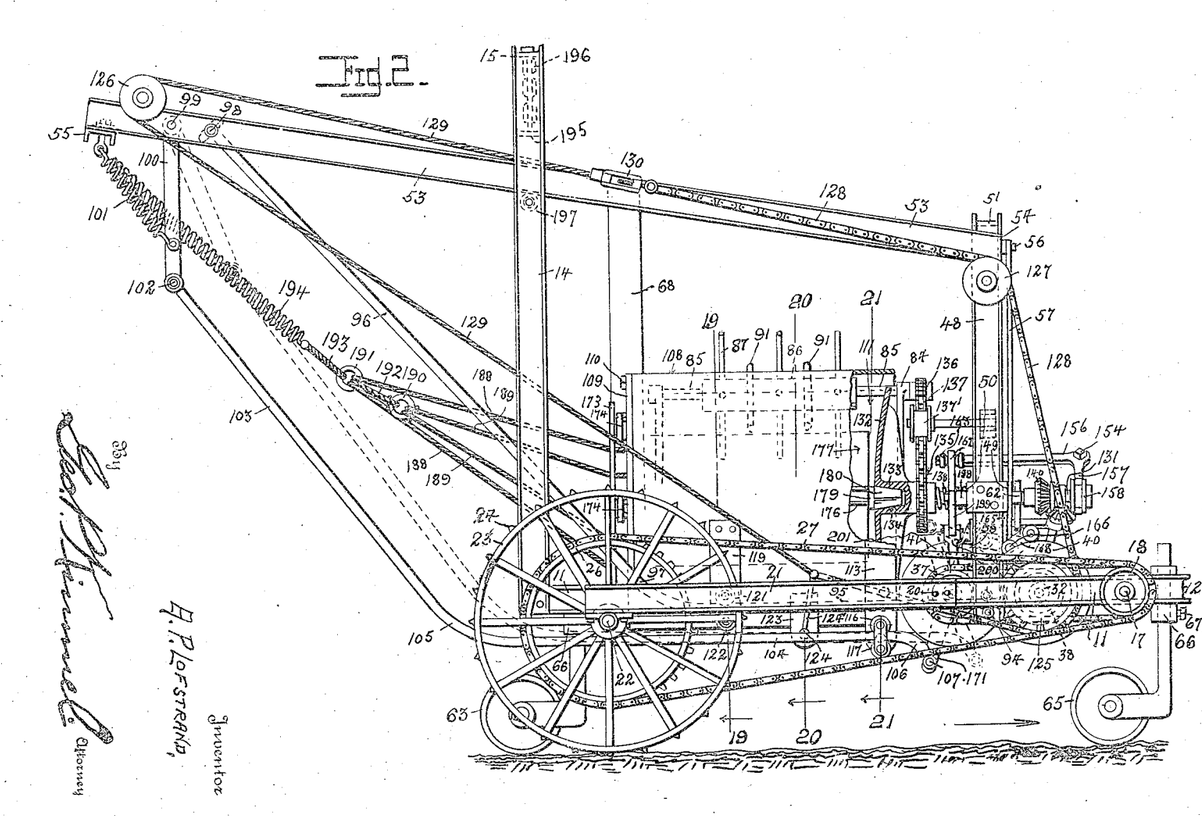
Fig. 2 is a side elevation, partly in section.
Figures 2, 4, 5, 15, 16:
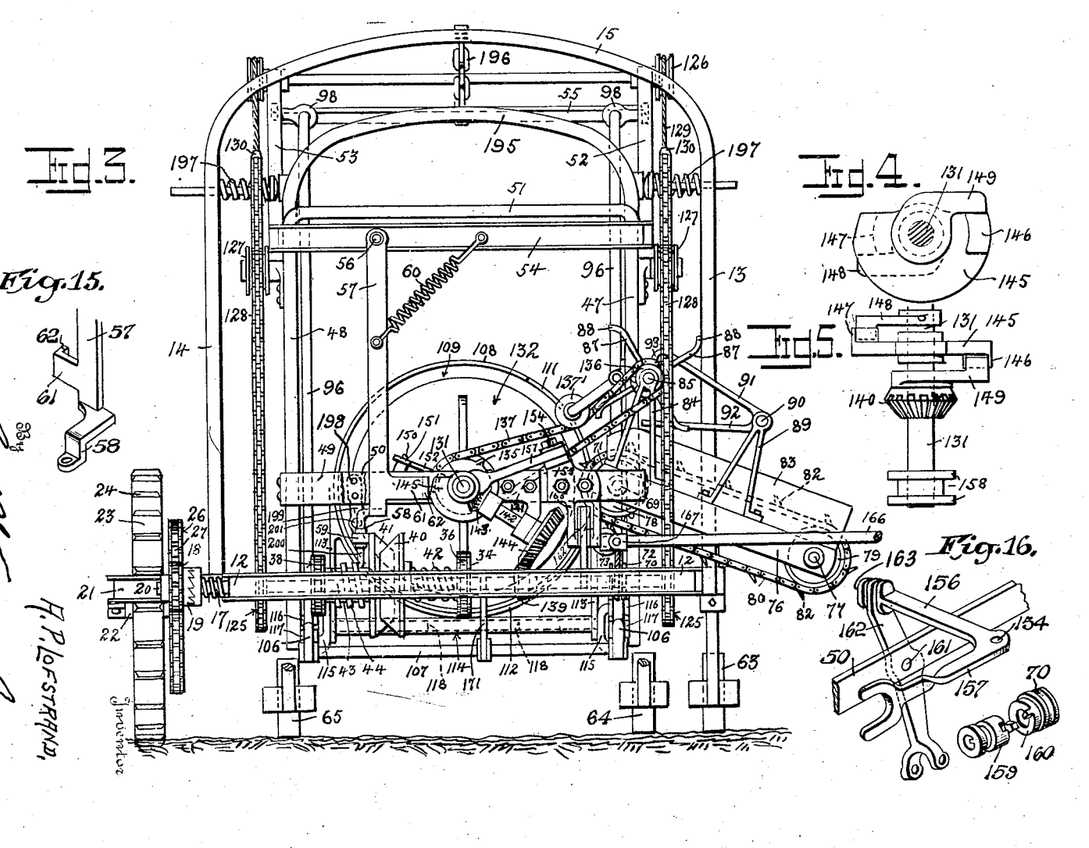
Fig. 4 is an enlarged detail of a portion of the device for checking the movement of the feeding elevator while the cage is being moved into a discharging position and returned to its receiving position.
Fig. 5 is a plan view of the parts shown in Fig. 4.
Fig. 15 is a perspective detail illustrating the construction of one of the trip lever devices.
Fig. 16 is a perspective detail of one of the shipper lever mechanisms.

The apparatus moves in the direction of the arrow shown in Figs. 1 and 2, and for the purpose of this description, the portion 12 will be referred to as the forward transverse member, and the end of the apparatus associated with the member 12 will be referred to as the forward end and the opposite end as the rear end.

Rigidly attached to the member 12 is a U-shaped frame 16, and mounted for rotation through the frame 16 is a main drive shaft 17, the outer end of the shaft extending through the member 11 and provided with a chain pinion 18 on its outer end. A spring controlled backing ratchet, represented at 19, is arranged upon the shaft 17, so that the chain pinion 18 will be rotated in one direction only, for obvious reasons.

Connected at 20 to the frame member 11 is a brace 21, and mounted for rotation through the frame member 11 and the rear end of the brace 21 is an axle 22, and mounted upon the axle is a relatively large traction or bearing wheel 23, the latter having the usual mud lugs 24 to insure the proper grip of the wheel upon the ground. Attached to the hub 25 of the wheel 23 is a chain wheel 26, around which and the pinion 18 a drive chain 27 is disposed. By this means the motion of the wheel 23 will be transmitted to the shaft 17 when the apparatus is moved forwardly, but motion will not be imparted to the shaft 17 when the machine is moved rearwardly, by the action of the backing ratchet 19.

Mounted to swing on the frame 16 by a universal joint indicated at 28 is a supporting frame including a transverse member 29 and rearwardly extending portions 30, 31. Mounted for rotation through the members 30, 31 is a forward counter shaft 32, and likewise mounted for rotation through the members 30, 31 near their rear ends is a rear counter shaft 33. Mounted for rotation with the shaft 17 is a chain pulley 34, and mounted for rotation with the shaft 33 is a similar chain wheel 35, and over the wheels 34, 35 an endless chain 36 is conducted. Mounted for rotation on the shaft 33 is a chain pulley 37, and mounted for rotation with the shaft 32 is a chain pulley 38, and operating over the chain pulleys 37, 38 is an endless chain 39. Mounted for rotation with the shaft 32 is a cone friction clutch element 40, and rotatively and slidably mounted on the shaft 33 is an opposing cone friction clutch member 41, the latter being spring supported as shown at 42, the spring operating between the hub of the cone clutch element 41 and the hub of the chain wheel 35. The hub 43 of the cone clutch element 41 is provided with spiral ribs 44 in worm gear form, and with a clutch element 45 coacting with an opposing clutch element 46 on the hub of the wheel 37, the object to be hereinafter explained.

Attached to the members 30, 31 between the shafts 32, 33 are vertical supports 47, 48 and attached to the members 47, 48 is a supporting frame including spaced sides 49, 50. At their upper ends, the members 47, 48 are connected as shown at 51, the three portions 47, 48 and 51 being preferably formed from a single piece of channel steel, as indicated.

Attached to the upper ends of the member 47, 48 is a relatively long U-shaped frame including spaced side portions 52, 53 and a transverse portion 54. The portions 52, 53 are connected at their rear ends by a transverse member 55.

Pivoted at 56 to the member 54 is a bar 57, the latter directed at its lower end toward the rear as shown at 58 and provided with a bearing roller 59 engaging the outer face of the cone clutch member 41. A relatively powerful spring 60 is connected between the members 54 and 57 to hold the member 57 yieldably in position. Branching from the member 57 is an arm 61 having a forwardly directed extension 62, the object to be hereinafter explained.

When in operation, the side of the apparatus next to the grain binder, or opposite to the tractor wheel 23, will be supported from the frame of the harvester and binder, the latter not being shown as it forms no part of the present invention, but when the machine is detached from the binder and harvester it must necessarily be supported independently, and to this end a plurality of detachable caster wheels are attached to the base frame, one represented conventionally at 63 at the rear end of the member 10, and two represented conventionally at 64, 65 pivotally attached to the forward transverse member 12. The caster wheels are adjustable vertically by any suitable means, for instance by slip collars represented at 66 and connected to the frame of the caster wheels by set screws 67, so that when not in use, the caster wheels may be elevated near the base frame, as will be obvious.

Depending from the member 52 is a standard 68 and journaled at one end to the lower end of the standard is a shaft 69, while the opposite end of the shaft is journaled in the frame member 50. Mounted loosely on the shaft 33 is a belt pinion 70, and mounted for rotation with the shaft 69 is a belt pulley 71, and operating over the pinion 70 and pulley 71 is a belt 72, preferably a cord belt, of the half twist form and held in position by a guide pulley 73. By this means the motion of the shaft 33 will be transmitted to the shaft 69.

Swinging upon the shaft 69 are side bars 75, 76 and journaled in the side bars at their outer ends is a shaft 77. Mounted respectively upon the shafts 69, 77 are chain wheels 78, 79 over which endless chains 80 operate. The chain wheels and chains are disposed in close proximity to the side members 75, 76, and the chains are connected by carrier bars 81 at relatively short intervals, and the bars are each provided with a plurality of fingers 82, preferably disposed obliquely to the paths of the chains. The pulleys, chains, bars, and teeth constitute an endless elevating apparatus to receive the bound bundles from the chute of the binder and convey them to the receiving cage.

Suitable guide boards or guards 83 are arranged upon the side bars 75, 76 to prevent the bundles from being displaced from the elevator.

Figures 7, 8:
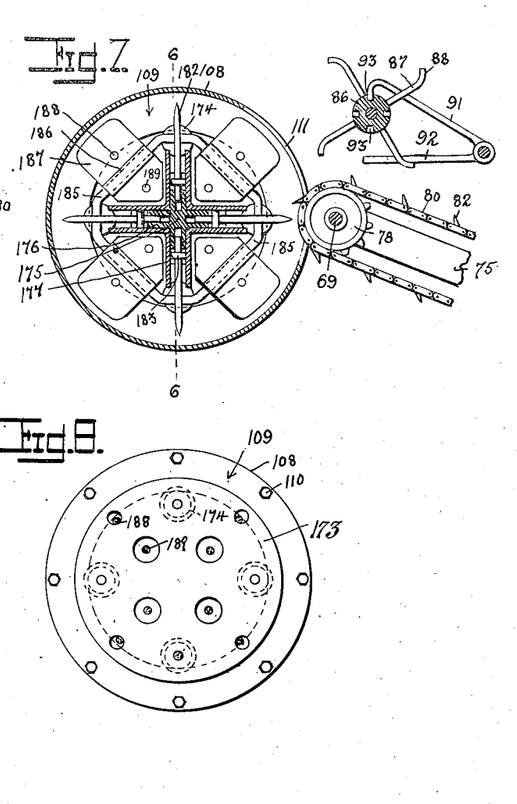
Fig. 7 is a detail of a portion of the feeding elevator and a transverse section on the line 7—7 of Fig. 6 of the bundle receiving cage.
Fig. 8 is an elevation from the rear end of the receiving cage.

Rising from the side members 75, 76 are standards 84, and mounted for rotation by trunnions 85 in the standards is a drum 86, and extending rigidly from the drum are fingers or rods 87 curved at their outer ends as shown at 88. Any required number of the rods 87 may be employed but generally four will be used as shown in Figs. 3 and 7. Rising from the members 75, 76 are other standards 89, and mounted for oscillation in the latter standards is a shaft 90, and carried by the shaft are substantially V-shaped members including diverging portions 91, 92. Any required number of the members 91, 92 may be employed but generally two will be sufficient as shown in Fig. 1. At their free ends the members 91 will be directed downwardly as shown to consecutively enter sockets 93 in the drum 86 and hold the member 91 adjacent the conveyor belt 80—82 as illustrated in Fig. 7, and in the paths of the bundles as they pass over the elevating device, the object to be hereinafter explained.

The lower free end of the elevator device will be supported from the grain chute of the binder in any suitable manner, not shown, and is adjustable vertically to adapt it to different forms and sizes of binders.

Rigidly connected at 94 to the lower ends of the members 47, 48 are track members, preferably formed of tubing, and each including a horizontal portion 95 and a rearwardly and upwardly inclined portion 96, and a connecting curved portion 97. At their upward and rear ends the portions 96 are rigidly attached at 98 to the members 52 and 53. Pivoted at 99 to the members 52 and 53 are arms 100, each yieldably supported by a spring 101, and connected respectively to the free ends of the arms 100 and to the rear transverse member 55 as shown in Figs. 1 and 2. Pivoted at 102 to the lower end of each of the arms 100 is a lower track member comprising an inclined portion 103, a substantially horizontal portion 104, and a connecting curved portion 105. At their front ends the portions 104 are curved downwardly as shown at 106, the downwardly curved portions being connected by a rod 107, or the like.

The cage for receiving the bound bundles to form the shock is represented as a whole at 108, preferably of sheet steel in cylindrical form, open at the forward end and provided with an annular member 109 at the rear end, the latter detachably connected to the body 108 by cap bolts 110 or the like. The body 108 is disposed initially, or when in its receiving position, opposite the discharge end of the elevator device and is provided with a relatively large opening indicated at 111, to receive the bundles of bound grain from the elevator.

Attached to the body 108 at its open end is a saddle member including a curved intermediate portion 112 and vertical end portions 113, the latter extending below the lower line of the body.

Extending between the lower ends of the members 113 is a tubular support 114, and bearing against the outer faces of the members 113 are brackets 115 having journals at their ends to receive grooved guide pulleys 116, 117 bearing initially upon opposite sides of the members 104 near their forward or downwardly curved ends 106 as shown in Fig. 2. Extending from each of the brackets 115 is a stop rod indicated at 118, the latter extending for its full length into the tubular member 114 and slidable therein.

The rods 118 are rigidly connected to the brackets 115 and engage loosely in the tubular member 114, so that the lower track members may move laterally to a limited extent by their resiliency, without disturbing the other parts.

Attached to the body 108 and spaced from its rear end are saddle devices 119, and bearing against the outer faces of the saddle devices are brackets 120 similar to the brackets 115, and carrying grooved rollers 121, 122 bearing upon opposite sides of the track members 95, 96, and 97.

Short shafts 119' are connected to the brackets 120 and are slidable therethrough to permit lateral movement of the track members.

Depending from the body 108 between the saddle members 113 and 119 are brackets 123, and extending loosely through these latter brackets is a rod 124.

Mounted to rotate with the shaft 32 are chain pulleys 125, and mounted for rotation respectively upon the vertical members 47, 48 and the beam members 52, 53 are guide pulleys 126, 127. Engaging around the chain pulleys 125 and over the guide pulleys 127 are sections of chain 128. At its lower forward end the chain 128 is coupled to a section of cable 129, while the opposite end of the chain 128 is coupled, preferably by a turn buckle 130, to the opposite end of the cable 129, the cables passing around the guide pulleys 126 and 127. At their lower juncture the members 128, 129 are connected by short sections of cables or rods 124' to the transverse rod 124.

By this arrangement it will be obvious that when the shaft 32 is rotated the connected chain 128 and cable 129 will draw the cage 108 along the tracks and transfer it from a horizontal to a vertical position, the lateral play of the shaft 119' and the rod 124 permitting the cage to sway laterally when running over uneven ground and thus obviate any tendency of the parts to cramp, as hereinafter more fully explained.

Mounted for rotation and slidable through the frame member 49, 50 is a shaft 131, and mounted upon or integral with the shaft is a relatively large stop plate 132, preferably with its rear face convex or dish shaped as shown in Fig. 2. The hub 133 of the member 132 is provided with a socket 134, square or other form than round, and facing toward the interior of the body 108. Mounted for rotation with the shaft 131 is a chain pulley 135, and mounted upon the shaft 85 of the drum 86 is a chain pinion 136, an endless chain 137 engaging around the chain wheel 135 and pinion 136, an idler or tension pulley 137' being suitably supported to bear upon the chain 137 to take up the slack and maintain the chain at a uniform tension. A spring 138 operates between the hub of the wheel 135 and the frame member 50 to maintain the disk 132 yieldably and initially in its forward position. Mounted upon the shaft 32 is a beveled gear wheel 139 and mounted loosely upon the shaft 131 is a beveled pinion 140. Supported by a bracket 141 from the frame member 49 is an obliquely directed shaft 142 carrying beveled pinions 143 and 144 at their ends and engaging respectively with the gear 139 and the pinion 140. By this means the motion of the shaft 32 is transmitted to the pinion 140.

Mounted for rotation on the shaft 131 is a trip device comprising a plate 145 having stop lugs 146 and 147 extending from its opposite faces. Attached to the shaft 131 between the plate 145 and the frame member 49 is a cam device 148 adapted to engage the stop lug 147 when the shaft is rotated. Mounted to rotate with the gear pinion 140 is a cam device 149 adapted to engage the stop lug 146 when the pinion is rotated.

The plate 145 is designed to engage the outturned terminal 62 of the extension 61 of the arm 57 when the plate is rotated to disconnect the roller 59 from the cone clutch element 41.

Pivoted at 150 to a suitable bracket attached to the frame member 49 is a bell crank lever with the short arm 151 extending into the path of the bar 57 and the long arm 152 forked at its free end and engaged between stop rings on the shaft 131.

Pivoted at 154 to a bracket 165 attached to the member 49 is another bell crank lever with one arm 156 extending rearwardly over the frame members 49, 50, and the other arm 157 forked at its free end and engaging between stop rings 158 on the shaft 131.

Slidable on the shaft 33 and rotatable therewith in any suitable manner, for instance by a feather and key device, is a clutch element 159 coacting with an opposing clutch element 160 associated with the belt pinion 70. Pivoted at 161 to the frame member 50 is a shipper lever 162, with its lower end forked and engaging between shipper rings on the clutch element 159 and with its upper end pivoted at 163 to the free end of the longer arm 156 of the bell crank lever.

Engaged around the shaft 33 is a sleeve 164, and connected to the frame member 50 is a depending hanger 165, and mounted for oscillation on the lower end of the hanger 165 is a rock shaft 166, the latter having a universal joint 167 preferably near the hanger 165. Mounted to oscillate with the shaft 166 are spaced arms 168, and extending from the sleeve 164 is another arm 169 which is connected by a link 170 to the arm 168. Depending from the sleeve 164 at its opposite end is an arm 171, the latter being connected to the rod 107 which connects the downturned ends 106 of the track members 104. By this arrangement it will be obvious that when the shaft 166 is oscillated the track members 104 will be drawn bodily toward the front of the apparatus and assume the position shown by dotted lines in Fig. 2 against the resistance of the springs 101, the object to be hereinafter explained.

The vertical adjustment of the free end of the elevating device will cause the standards 84 and 89 to move toward the cage, or away from it, as the case may be, and thus change the length of the chain 137, and to compensate for this change, and maintain the chain in operative position regardless of the position of the drum 86, a gravity actuated roller 155 is swingingly connected to the adjacent frame member 47 as shown in Figs. 3 and 25.

Figure 6:
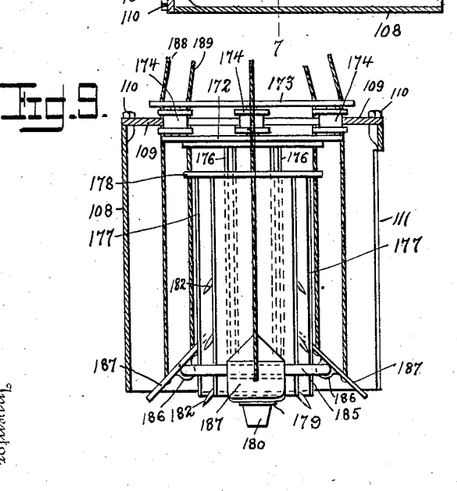
Fig. 6 is a longitudinal sectional elevation of the combined shock receiving and discharging apparatus in horizontal or receiving position taken on the line 6—6 of Fig. 7.
Figure 9:
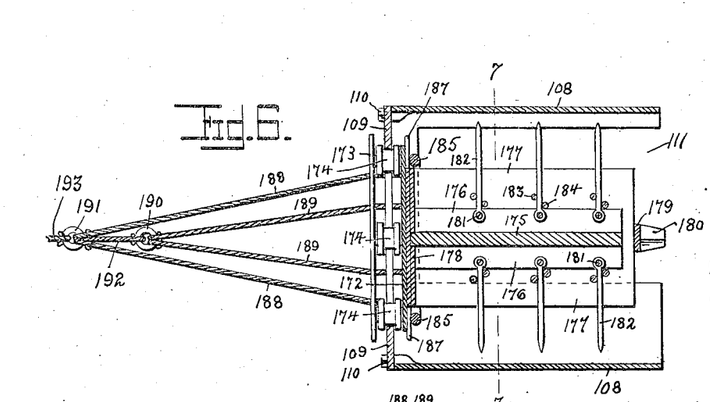
Fig. 9 is a view similar to Fig. 6 with the cage and its combined mechanism in a vertical or discharging position.

Disposed within the cage 108 and relatively near the annular member 109 is a supporting disk device 172 preferably in two thicknesses as shown in Figs. 6 and 9, and disposed externally of the cage and also near the annular member 109 is another disk device 173, and journaled between the disk devices and bearing against the inner edge of the annular member are grooved bearing rollers 174. By this means the disk devices 172 and 173 are connected together and freely rotative within the annular member, the latter serving as a guide track to the rollers.

Attached to the inner face of the disk member 172 is a support 175 including radially directed divided branches 176, and slidable over the member 175, 176 are L-shape members 177, the elbow portions of the latter operating against the branches 176 as guides as shown more clearly in Fig. 7. The member 175 and its branches 176 is attached rigidly to the disk member 172, and slidable upon the branches 176 is another disk device 178, the L-shape members 177 being attached rigidly to the disk member 178 and movable therewith longitudinally of the branch members 176, to a limited extent. The L-shaped members 177 are united at the ends next to the open end of the body member 108 by a spider member 179, and extending from the member 179 is a lug 180, preferably tapered and formed to closely engage in the socket 134 of the member 132 as illustrated in Fig. 2. By this means the coacting members 176, 177 are rotative with the member 132. Pivoted at 181 between the portions 176 are a plurality of pointed pins or rods 182, the latter extending outwardly when in one position in advance of the outer edges of the L-shaped member 177. Extending through the members 177 in advance of the outer edges of the members 176 are guide pins 183, 184, arranged in pairs as shown in Fig. 6 with one pin of each pair nearer the center of the cage than the other. By this arrangement when the member 175, 176 is at one end of its stroke or in the position shown by full lines in Fig. 6, the pins 183, 184 will hold the rods 182 at right angles to the longitudinal axis of the member, or when the disk member 178 is in contact with the disk member 172, and then when the member 175, 176 is moved into its outer position as shown by full lines in Fig. 9, the pins will be withdrawn entirely within the lines of the L-shape members 175 as shown in Fig. 9.

Extending around the outer edges of the L-shape members 177 is an endless rod or ring 185, and mounted to swing at 186 upon the member 185 opposite the L-shape members 177 are plate devices 187, the major portions of the plates extending initially toward the inner face of the shell member 108 while the minor portions of the plates are triangular in outline and extend into the spaces between the faces of the L-shape members 177 shown in Fig. 7. Connected to each of the members 187 externally of the hinged portions 186 is a draw cable 188, and likewise connected to the inner triangular portions of each plate 187 is another draw cable 189. Four of the members 187 are shown for illustration, consequently there will be four of the cables 188 and four of the cables 189. The cables all extend through suitable apertures in the disks 173 and in contact with the outer periphery of the disk 172 as illustrated in Fig. 8. The four cables 189 converge at some distance from the disk 173 and are united in a ring 190, while the cables 188 likewise converge at a greater distance from the disk 173 and unite in a ring 191. Another section of cable 192 connects the rings 190, 191 as shown in Figs. 1, 2 and 6. Connected to the ring 191 is a single pull cable 193, the latter being coupled by a relatively long spring 194 to the transverse member 55. Connected to the members 52, 53 substantially opposite the arching portion 15 is another arching member 195, the latter being coupled to the member 15 by a section of chain or the like 196. By this means the frame members 52, 53 and their attachments including the tracks 96, and 103, the cage 108 and its attachments and all of the mechanism except the shaft 17 and its attachments, are flexibly supported and adapted to swing laterally between the members 13 and 14 and to likewise swing upon the universal joint 28. By this means the frame members 10, 11, and 12 and the supporting traction wheels 23 are free to follow the contour of the ground over which the apparatus is moved, while the flexibly supported mechanism will retain a substantially vertical position by gravity.

If found necessary suitable spring devices 197 may be arranged between the members 13 and 14 and 195, as shown in Fig. 3. Any suitable operating and holding means may be employed to operate and control the shaft 166, but as the controlling and holding means forms no part of the present invention it is not deemed necessary to illustrate them.

Attached at 198 to the frame member 50 is an arm 199 having a pawl device 200 pivoted at 201 to its lower end, the free end of the pawl extending into the paths of the teeth 44 of the worm device. By this arrangement when the worm device is moved in one direction longitudinally of the shaft 33 the pawl device will slip from the teeth 44 and produce no effect, but when the worm device is moved in the opposite direction longitudinally of the shaft 33 the tip of the pawl will engage between the teeth 44 and cause the clutch element 41 to be held away from the clutch element 40 and hold the clutch element disengaged from the clutch element 40.

The worm gear element is preferably of the conventional return groove construction, as shown, and operates as hereafter explained.

With the device thus constructed the operation is as follows:

The apparatus will be coupled to move with the harvester and binder with the chute of the binder arranged to deliver the bound bundles upon the elevating device of the improved apparatus, and drawn forwardly with the binder. The caster wheels are elevated into inoperative position and the whole weight of the apparatus borne by the harvester and binder and the tractor wheel 23. The bound bundles are moved toward the opening 111 of the cage, and as they pass beneath the member 92 they elevate the latter and correspondingly elevate the member 91 and release the drum 86, and as the bundles pass beneath the fingers 87, 88 they cause the fingers to rotate the drum, and the latter being coupled to the shaft 131 by the chain 137 rotate the shaft at a relatively slow speed, and the members 175, 176 and 177 being coupled to the shaft by the stud 180, slowly rotate the L-shaped members together with the pointed rods 182 which coact to form a series of pockets in the receiver for the bound bundles. The gearing will be so proportioned that when two of the bundles have been passed into the space between the fingers 182 nearest to the opening 111, the fingers will have been rotated to a sufficient extent to bring the next set of fingers opposite the opening 111, and so on until all four of the pockets formed by the fingers 182 have been supplied with two of the bundles. When this takes place the shaft 131 will have been rotated to a sufficient extent to cause the arm 148 to engage the lug 147 and rotate the cam plate 145 to a sufficient extent to actuate the arm 57 by its engagement with the offset 62, and move the lever arm 57 against the resistance of the spring 60 and enable the spring 42 to move the cone clutch element 41 away from the cone clutch element 40 and couple the clutch device 45 and 46 and start the rotation of the shaft 32, and also start the movement of the bundle receiving cage along its tracks.

This movement of the cone clutch element 41 causes the clutch element 45 to engage the clutch element 46 and thus couples the constantly rotating shaft 33 to the shaft 32.

The concentric portion of the cam 145 holds the lug 62 and roller 59 away from the cone 41 and enables the spring 42 to hold the cone 41 away from the cone 40 and while the clutch 45—46 is engaged and the shaft 32 revolving.

When the flat or excentric portion of the cam 145 reaches the lug 62 the spring 60 will be released and cause the roller 59 to move the cone 41 against the resistance of the weaker spring 42 toward contact with the cone 40 and rotate the shaft 32 in reverse order.

In the meantime, the terminal of the worm 44 which is adjacent to the pawl 200 enters the channels of the worm and causes the sleeve 43 to be slowly moved along the shaft 33 or retarded and held in neutral position for a short time, and thus stops the motion of the shaft 32 until the cage has been moved into discharging position and returned to receiving position.

When the last rib of the worm 44 reaches the pawl 200, the latter is returned to its initial position by the action of the oblique return groove of the worm in the usual manner.

The tractor wheel 23 constantly rotates the shaft 17 which in turn constantly rotates the shaft 33 through the chain 36. The spring 60 is strong enough to hold the roller 59 against the clutch element 41 and compress the lighter spring 42, but the concentric part of the cam 145 holds the lever 57 and its lug 62 and roller 59 against the pull of the spring 60, and correspondingly holds the clutch 45—46 disengaged.

When the concentric portion of the cam 145 leaves the lug 62, the tension on the spring 60 is released and the roller 59 is moved by spring 60 to move the cone 41 against the resistance of the lighter spring 42 and couples the cone 40 and rotates the shaft 32, the pulley 37, and the clutch member 45. The cone 41 and its sleeve 43 is disposed in three positions, first, engaged with the clutch 46; second, engaged with cone 40; and third, held in neutral position by the coaction of worm 44 and pawl 200.

The pawl 200 operates to move the cone 41 slowly into neutral position and hold the clutch 45—46 open and the cone 41 free from the cone 40 during the time the cage is being turned into vertical position and returned to operative position.

When the cage has received its load of eight bundles, or the requisite number to form a shock by the rotation of the cage through the action of the moving bundles against the fingers 87, as before described, the cam 148 will have moved the cam plate 145 one half a revolution and released the lever arm 57 and cause the spring 60, which is stronger than the spring 42, to apply a pulling force on the lever arm 57 and press the roller 59 against the cone clutch element 41 and start the latter toward the cone clutch element 40, and also disengage the clutch element 46. In the meantime the pawl 200 will be engaged by the ribs 44 as before described, to cause the cone clutch element 41 to be held back or move slowly toward the cone clutch element 40, or until the shaft 32 has been rotated a sufficient number of times to pull the container into discharging position. The shaft 32 will rotate the gear pinion 140 through the connecting gearing 139, 144, and 143, and shaft 142, and cause the arm member 149 to engage the lug 146 and thus rotate cam plate 145 and cause it to act on the projection 62 and move the lever 57 laterally against the resistance of the spring 60. This action entirely disconnects the cone clutch element 41, the sleeve 43 and clutch element 45, for the time being from both the cone clutch element 41 and the clutch element 46 and its chain wheel 37. The pawl 200 will be engaged by the worm-shaped ribs 44 and cause the cone clutch element 41 to be slowly moved toward the cone clutch element 40, and thus hold the container stationary a sufficient length of time for the machine to be moved forwardly to clear the shock and prevent its being overthrown by the container before starting on its return to receiving position. Thereafter the cone clutch element 40 will be engaged by the cone clutch element 41 and reverse the motion of the shaft 32 and return the container to receiving position.

Figures 10, 11, 12, 13, 14, 17, 18:
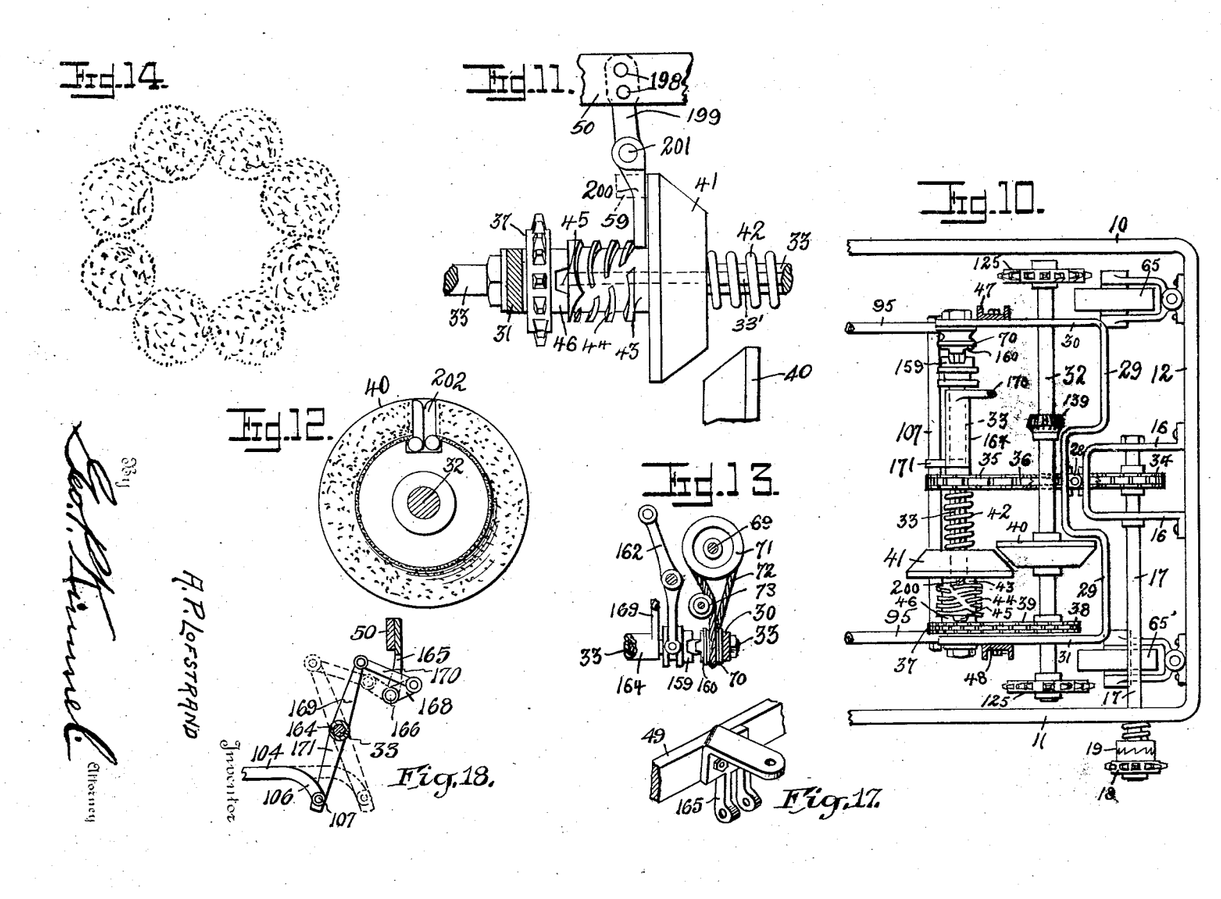
Fig. 10 is a plan view of the mechanism at the forward end below the line of the cage and elevator.
Fig. 11 is an enlarged detail of a part of the tripping mechanism.
Fig. 12 is an elevation of one of the cone clutch elements.
Fig. 13 is a detail of the driving mechanism of the elevator.
Fig. 14 is a diagrammatic view of one of the completed shocks.
Fig. 17 is a perspective view of the supporting bracket for the lever mechanism shown in Fig. 16.
Fig. 18 is a detail, partly in section, of the guide rail shifting mechanism.
Figure 19:
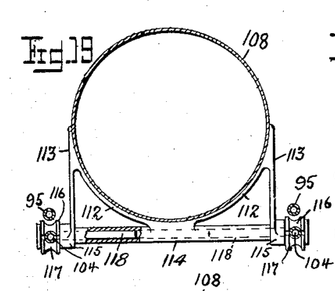
Fig. 19 is a transverse section on the line 19—19 of Fig. 2.
Figure 20:
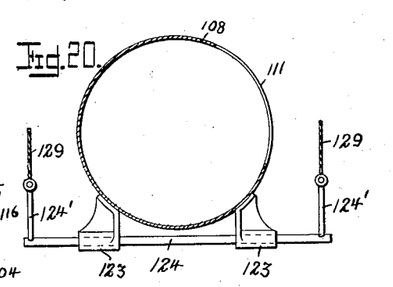
Fig. 20 is a transverse section on the line 20—20 of Fig. 2.
Figures 21, 24:
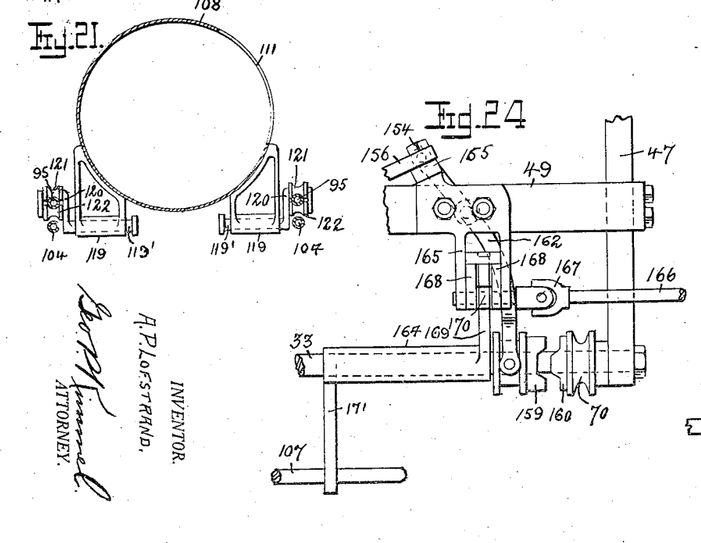
Fig. 21 is a transverse section on the line 21—21 of Fig. 2.
Fig. 24 is a front elevation of the parts shown in Fig. 22.
Figure 22:
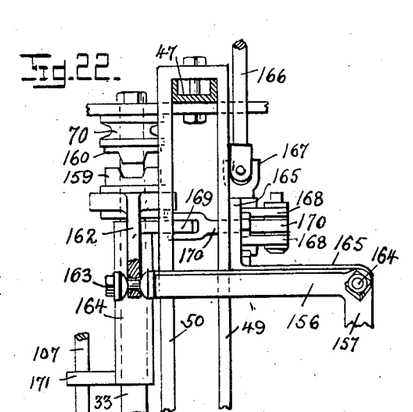
Fig. 22 is an enlarged plan view of a part of the apparatus illustrating certain details of its mechanism.
Figure 23:
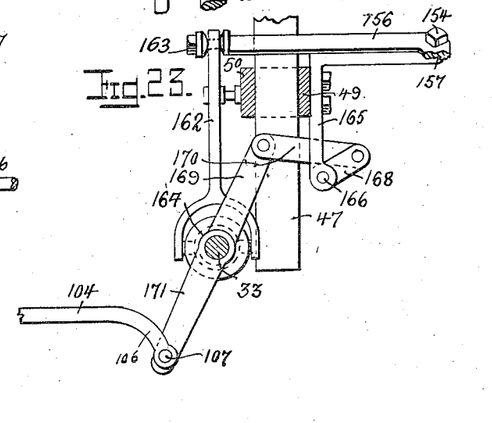
Fig. 23 is an end elevation of the parts shown in Fig. 22.

The pointed rods 182 will hold the bundles within the pockets in the cage until the latter has been moved into vertical position. The coaction of the spring 194 and the gravity of the cage 108 and its contents will hold the disk 178, the member 175, 176, and the ring member 185 and plates 187, in the position shown in Fig. 6, but when the cage has been moved into vertical position, the spring will cease to function and the gravity of the member 175, 176 will cause it to move downwardly within the L-shaped members 177 and cause the pins 183, 184 to withdraw the rods 182 and release the bundles of grain. At the same time, the ring 185 is released and moves downwardly by gravity and causes the plates 187 to assume inclined or dish shaped position by the weight of their heavier outer portions, and thus confine the grain ends of the bundles and cause them to lean toward a common central position, or with the butt ends distended. The bundles forming the shock are thus deposited upon the ground in a hollow slightly conical position with a central open space to provide for the circulation of air, as illustrated in Fig. 14.

When the cage and its pocket forming mechanism is disposed in bundle receiving position, the stud 180 when engaging the socket 134 moves the shaft 131 slightly toward the forward end of the apparatus against the resistance of the spring 138, thus actuating the bell crank lever 156, 157 and shipper lever 162 and causing the clutch element 159 to be coupled to the belt pulley 70 and thus apply motion to the conveyor belt, and when the clutch element 41 is moved into operative position as before described and the cage started toward discharging position, the reaction of the spring 138 will move the shaft 131 toward the rear and thus reverse the position of the clutch element 159 and release the cord pulley 70, and stop the movement of the conveyor belt and the further feeding of bundles therefrom. The bundles from the binder are thus held back and accumulate on the conveyor while the cage is being moved into discharging position and returned to receiving position.

When the cage discharges its load, the lever 199 and its pawl 200 coact with the worm shaped ribs 44 as before stated to hold the clutch element 41 out of action or in neutral position, and the cage returning mechanism stationary for a sufficient length of time to enable the apparatus to be moved forwardly for a sufficient distance to carry the suspended cage in a horizontal path clear of the recently deposited shock.

By this means all liability of the returning cage overturning the shock is obviated.

As the cage returns to receiving position, the member 185 together with the poised plates 187 is drawn into its former position and the members 177, 178 will be picked up by the member 185 acting against the disk member 178.

If the apparatus is moving over sloping ground, the operator by actuating the rock shaft 166, will adjust the lower track members as indicated by dotted lines in Fig. 2, and thus cause the grooved guide rollers 116 and 117 to correspondingly adjust the cage 108 and retain it in vertical position regardless of the slope of the field on which the apparatus is being operated.

The cone clutch elements 40 and 41 are covered with a suitable yieldable material such as leather, rubber or the like, and at one point on the periphery of one of the cone clutch elements, for instance the element 41, a pair of rollers or rods 202 are embedded in the surface as shown in Fig. 12, to prevent the moving cone from slipping on the other cone for obvious reasons.

I claim:—

1. In an apparatus of the class described, upper guide tracks and lower guide tracks in spaced relation and each including a horizontal portion and an inclined portion, a saddle device mounted for movement on the upper guide tracks, saddle devices mounted for movement on the lower guide tracks, a receptacle for the bundles of grain carried by said saddle devices, means for moving said receptacle along said tracks to cause the receptacle to assume a vertical position to discharge its load, means for adjusting the lower guide tracks to cause the cage to maintain a substantially vertical position while being moved, and means for returning said saddle devices and receptacle supported thereby to horizontal position.

2. In an apparatus of the class described, upper guide tracks and lower guide tracks arranged in pairs and in spaced relation and each including a horizontal portion and an inclined portion, a bundle receiving cage travelling on said tracks and movable thereon from a receiving into a discharging position, and means for adjusting one pair of said tracks to cause the cage to maintain a substantially vertical position while being discharged regardless of the slope of the ground over which the apparatus is moved.

3. In an apparatus of the class described, a supporting base structure open at the rear and connected by an upwardly directed arching support, a frame element swingingly suspended from said arching support and flexibly coupled to said base structure, a pair of upper guide tracks each including a horizontal portion and an inclined portion and rigidly connected at its lower end to said swinging frame, a pair of lower guide tracks spaced from the upper guide tracks and each movably coupled at one end to the swinging frame, lever arms spring supported and swinging from said swinging frame and pivoted at their free ends to the other ends of the lower tracks, a bundle receiving cage travelling on said tracks and movable thereon from a receiving to a discharging position, and means for moving said lower guide tracks to control the distance thereof from the upper guide tracks, and thereby maintaining the cage in vertical position while being discharged regardless of the position of the swinging frame or the contour of the ground.

4. In an apparatus of the class described, upper guide tracks and lower guide tracks in spaced relation and each including a horizontal portion and an inclined portion, saddle devices, guide sheaves carried by the saddle devices and engaging said guide tracks and initially mounted thereby on the horizontal portions of said tracks, a receptacle for the grain carried by said saddle devices, means for moving the saddle devices and the receptacle carried thereby along the horizontal and inclined portions of said tracks to cause the receptacle to assume a vertical position to discharge its load, means for adjusting the lower guide tracks to cause the cage to maintain a substantially vertical position while being moved, and means for returning said saddle devices and receptacle to horizontal position.

5. In an apparatus of the class described, pairs of guide tracks in spaced relation and each including a horizontal portion and an inclined portion, saddle devices, guide sheaves carried by said saddle devices and engaging said tracks, a receptacle for the grain supported by said saddle devices, an endless pull cable connected to said saddle devices, and means for actuating said pull cable to cause the saddle devices and the receptacle carried thereby to pass from a horizontal to a perpendicular position, means for adjusting one pair of said tracks to cause the cage to maintain a substantially vertical position while being moved, and means for reversing the motion of the pull cables to return the receptacle to receiving position.

6. In an apparatus of the class described, an outer base frame, an arching support carried by said outer base frame, an inner arching frame suspended by its arching portions from said arching support, a receptacle carried by said suspended frame initially in horizonal position and adapted to receive bundles of grain when discharged from a binder, means for moving said receptacle from a horizontal bundle receiving into a vertical bundle discharging position, and means for moving said receptacle from a bundle discharging to a bundle receiving position.

7. In an apparatus of the class described, an outer base frame, an arching support carried by said outer base frame, an inner base frame suspended from said arching support, guide tracks in spaced relation and supported by said suspended frame and by said inner base frame, saddle devices, guide sheaves carried by said saddle devices and engaging said tracks, a receptacle carried by said saddle devices and adapted to receive bundles of grain when discharged from a binder, means for moving said saddle devices and the receptacle carried thereby from a bundle receiving into a bundle discharging position, and means for returning said receptacle to bundle receiving position.

8. In an apparatus of the class described, an outer base frame, an inner base frame swinging from said outer base frame, supporting members carried by said inner base frame, guide tracks coupled at one end to said base frame and at their other ends to the supporting members, means for suspending said outer base frame relatively to said inner base frame, a receptacle for bundles of grain movably associated with said tracks, means for moving said receptacle relative to said tracks into discharging position, and means for returning the receptacle to grain receiving position.

9. In an apparatus of the class described, an outer base frame, an inner base frame swinging within said outer base frame, supporting members carried by the inner base frame, guide tracks coupled at one end to said inner base frame and at their other ends to the supporting members, means for suspending said inner base frame relatively to said outer base frame, a receptacle for the grain movably associated with said tracks, and a conveyor device movable with said outer base frame and adapted to discharge into said receptacle.

10. In an apparatus of the class described, an outer base frame, an inner base frame swinging within said outer base frame, supporting members carried by the inner base frame, guide tracks coupled at one end to said inner base frame and at their other ends to the supporting members, means for suspending said members relatively to said inner base frame, a receptacle for the grain movably associated with said tracks, a carrier device movable with said inner base frame in position to discharge into said receptacle, means for adjusting said carrier device, and a bundle feeding device rotative relatively to said carrier device.

11. In an apparatus of the class described, an outer base frame, an arching frame carried by the base frame, an inner base frame swingingly coupled to the outer base frame, an arching frame carried by the inner base frame, supporting members in spaced relation and connected to the arching frame of the inner base frame, means for swingingly suspending the supporting members from the arching frame of the outer base frame, upper guide tracks and lower guide tracks each including a horizontal portion and an inclined portion, and coupled relatively to said inner base frame and to said supporting members, a receptacle movable on said tracks, means for moving said receptacle along said tracks into discharging position, and means for returning said receptacle into receiving position.

12. In an apparatus of the class described, an outer base frame, an arching frame carried by the base frame, an inner base frame swingingly coupled to the outer base frame, an arching frame carried by the inner base frame, supporting members in spaced relation and connected to the arching frame of the inner base frame, means for swingingly suspending the supporting members from the arching frame of the outer base frame, upper guide tracks rigidly connected to said inner base frame and to said supporting members, lower tracks adjustably coupled to said inner base frame and to said supporting members, a receptacle movable on said tracks, means for moving said receptacle along said tracks into discharging position, means for returning said receptacle to receiving position, and means for adjusting said lower tracks to cause said receptacle to retain its vertical discharging position regardless of the slope of the ground.

13. In an apparatus of the class described, an outer base frame, an arching frame carried by the base frame, an inner base frame swingingly coupled to the outer base frame, an arching frame carried by the inner base frame, supporting members in spaced relation and connected to the arching frame of the inner base frame, means for swingingly suspending the supporting members from the arching frame of the outer base frame, upper guide tracks rigidly connected to said inner base frame and to said supporting members, arms spring supported and swinging from said supporting members, lower tracks adjustably coupled at one end to said inner base frame and pivotally connected at their other ends to said arms, a receptacle movable on said tracks, means for moving said receptacle along said tracks into discharging position, means for returning said receptacle to receiving position, and means for adjusting said lower tracks to cause said receptacle to retain its vertical discharging position regardless of the slope of the ground.

14. In an apparatus of the class described, an outer base frame, an arching frame carried by the base frame, an inner base frame swingingly coupled to the outer base frame, an arching frame carried by the inner base frame, supporting members in spaced relation and connected to the arching frame of the inner base frame, means for swingingly suspending the supporting members from the arching frame of the outer base frame, upper guide tracks and lower guide tracks each including a horizontal portion and an inclined portion, and coupled relatively to said inner base frame and to said supporting members, a receptacle movable on said tracks, means for moving said receptacle along said tracks into discharging position, means for returning said receptacle into receiving position, a feeding device adapted to receive bound bundles of grain and connected to move with said inner base frame, a drum having a plurality of radiating fingers extending consecutively into the paths of the bundles passing over the feeding device, a combined holding and trip device associated with said drum and adapted to be operated by the bundles passing over the feeding device, and means whereby the rotation of the drum by the passing bundles is transmitted to the mechanism of the receptacle.

15. In an apparatus of the class described, an outer base frame, an arching frame carried by the base frame, an inner base frame swingingly coupled to the outer base frame, an arching frame carried by the inner base frame, supporting members in spaced relation and connected to the arching frame of the inner base frame, means for swingingly suspending the supporting members from the arching frame of the outer base frame, upper guide tracks and lower guide tracks each including a horizontal portion and an inclined portion and coupled relatively to said inner base frame and to said supporting members, a receptacle movable on said tracks, means for moving said receptacle along said tracks into discharging position, means for returning said receptacle into receiving position, means within said receptacle for separately holding bundles of grain therein, a feeding device adapted to receive bound bundles of grain and connected to move with said inner base frame, a drum having a plurality of radiating fingers extending consecutively into the paths of the bundles passing over the feeding device, a combined holding and trip device associated with said drum and adapted to be operated by the bundles passing over the feeding device, and means whereby the rotation of the drum by the passing bundles is transmitted to the bundle holding mechanism of the receptacle.

16. In an apparatus of the class described, a cage having an opening in one side, a member mounted for rotation in said cage and including a plurality of radiating portions, a plurality of rods swinging from said radiating portions and adapted to be projected in advance thereof or to be withdrawn within the same, a member including radiating portions slidable over the rotating member and having pins between which said rods project, and means for actuating said slidable member to cause said pins to project the rods when the slidable member is moved in one direction and to withdraw the rods when the slidable member is moved in the opposite direction.

17. In an apparatus of the class described, a cage having an opening in one side and an annular flange at one end constituting a guide track, outer and inner disks in spaced relation and connected by bearing rollers engaging said annular track, and rotative within the same, a member carried by said inner disk and rotative therewith and including a plurality of radiating portions, a plurality of rods swinging from said radiating portions and adapted to be projected in advance thereof or to be withdrawn within the same, a member including radiating portions slidable over the disk carried member and having pins between which said rods project, and means for actuating said slidable member to cause said pins to project the rods when the slidable member is moved in one direction and to withdraw the rods when the slidable member is moved in the opposite direction.

18. In an apparatus of the class described, a cage having an opening in one side, a member mounted for rotation in said cage and including a plurality of radiating portions, a plurality of rods swinging from said radiating portions and adapted to be projected in advance thereof or to be withdrawn within the same, a member including radiating portions slidable over the rotating member and having pins between which said rods project, means for actuating said slidable member to cause said pins to project the rods when the slidable member is moved in one direction and to withdraw the rods when the slidable member is moved in the opposite direction, an endless member movable over the slidable member, a plurality of plates pivoted upon said endless member, whereby when said cage is disposed in vertical position the endless member will move over the slidable member and cause the plates to converge the head ends of the bundles as they are discharged from the cage.

19. In an apparatus of the class described, a cage having an opening in one side, a member mounted for rotation in said cage and including a plurality of radiating portions, a plurality of rods swinging from said radiating portions and adapted to be projected in advance thereof or to be withdrawn within the same, a member including radiating portions slidable over the rotating member and having pins between which said rods project, means for actuating said slidable member to cause said pins to project the rods when the slidable member is moved in one direction and to withdraw the rods when the slidable member is moved in the opposite direction, an endless member movable over the slidable member, a plurality of plates pivoted upon said endless member, an outer pull cable connected to each plate externally of the endless member and united at their outer ends, an inner pull cable connected to each plate internally of said endless member and connected at their outer ends, a flexible element connected to said pull cables at their connected ends, another pull cable connected to the united ends of the outer pull cables, and yieldable means connected to said last mentioned pull cable.

20. In an apparatus of the class described, an outer base frame including an upwardly arching portion, a drive shaft carried by said outer base frame, an inner base frame swinging upon said outer base frame and including an upwardly arching portion, supporting members connected to the arching portion of the inner base frame, means for swingingly coupling the supporting members to the arching portion of the outer base frame, guide tracks in spaced relation and carried respectively by said inner base frame and said supports, a receptacle adapted to receive bound boundles of grain from a harvester and binder and movable on said tracks, a drive shaft carried by said outer base frame, a forward counter shaft carried by said inner base frame, a rear counter shaft carried by said inner base frame, means for transmitting motion to said drive shaft, means for transmitting the motion of said drive shaft to said rear counter shaft, means for transmitting the motion of said rear counter shaft to said forward counter shaft, means operative by the forward counter shaft for moving the receptacle upon said tracks into bundle discharging position when rotated in one direction and returning the receptacle into bundle receiving position when rotated in the other direction.

21. In an apparatus of the class described, an outer base frame, an inner base frame swingingly coupled to the outer base frame, supporting members carried by the inner base frame, means for swingingly suspending said supporting members from said outer base frame, upper guide tracks and lower guide tracks in spaced relation and connected respectively to said inner base frame and to said supporting members, a receptacle adapted to receive bundles of grain from a harvester and binder and movable on said tracks, a drive shaft carried by said outer base frame, means whereby the motion of the drive shaft causes the movements of the receptacle on the tracks, a rear counter shaft carried by said inner base frame, a forward counter shaft carried by said inner base frame, means for transmitting motion to said drive shaft, means for transmitting motion from said drive shaft to said rear counter shaft, a transmitting element rotative on said rear counter shaft, a receiving element rotative with the said forward counter shaft, means for transmitting the motion of the transmitting element to the receiving element, a clutch element associated with said transmitting element, a clutch element carried by the forward counter shaft, coacting clutch elements slidable on and rotative with the rear counter shaft and adapted to be alternately coupled to the clutch element which is rotative with the rear counter shaft and the clutch element which is rotative with the forward counter shaft or held disconnected from both, and means operative by the forward counter shaft for actuating the clutch elements associated with the rear counter shaft.

22. In an apparatus of the class described, an outer base frame, an inner base frame swingingly coupled to the outer base frame, supporting members carried by the inner base frame, means for swingingly suspending said supporting members from said outer base frame, upper guide tracks and lower guide tracks in spaced relation and connected respectively to said inner base frame and to said supporting members, a receptacle adapted to receive bundles of grain from a harvester and binder and movable on said tracks, a drive shaft carried by said outer base frame, means whereby the motion of the drive shaft causes the movements of the receptacle on the tracks, a rear counter shaft carried by said inner base frame, a forward counter shaft carried by said inner base frame, means for transmitting motion to said drive shaft, means for transmitting motion from said drive shaft to said rear counter shaft, a transmitting element rotative on said rear counter shaft, a receiving element rotative with said forward counter shaft, means for transmitting the motion of the transmitting element to the receiving element, a clutch element associated with said transmitting element, a clutch element carried by the forward counter shaft, coacting clutch elements slidable on and rotative with the rear counter shaft and adapted to be alternately coupled to the clutch element which is rotative with the rear counter shaft and the clutch element which is rotative with the forward counter shaft, a spiral rib associated with the coacting clutch elements, and a pawl device adapted to be engaged by the ribs when the same are rotated in one direction.

23. In an apparatus of the class described, an outer base frame, an inner base frame swingingly coupled to the outer base frame, supporting members carried by the inner base frame, means for swingingly suspending said supporting members from said outer base frame, upper guide tracks and lower guide tracks in spaced relation and connected respectively to said inner base frame and to said supporting members, a receptacle adapted to receive bundles of grain from a harvester and binder and movable on said tracks, a drive shaft carried by said outer base frame, means whereby the motion of the drive shaft causes the movements of the receptacle on the tracks, a rear counter shaft carried by said inner base frame, a forward counter shaft carried by said inner base frame, means for transmitting motion to said drive shaft, means for transmitting motion from said drive shaft to said rear counter shaft, a transmitting element rotative on said rear counter shaft, a receiving element rotative with said forward counter shaft, means for transmitting the motion of the transmitting element to the receiving element, a clutch element associated with said transmitting element, a clutch element carried by the forward counter shaft, coacting clutch elements slidable on and rotative with the rear counter shaft and adapted to be alternately coupled to the clutch element which is rotative with the rear counter shaft and the clutch element which is rotative with the forward counter shaft, bundle receiving devices within said receptacle, a shaft carried by the inner base frame longitudinally of the receptacle, means for coupling said shaft to the bundle receiving devices, a disk rotative on said longitudinally directed shaft and having diametrically opposite lugs extending from its opposite faces, a swinging lever arm extending into the paths of one of the clutch elements of the rear counter shaft and of the disk, an outer pawl device rotative on said horizontal shaft and adapted to engage one of the lugs of said disk, means carried by the forward counter shaft for actuating the outer pawl device, and an inner pawl device rotative with the horizontal shaft.

In testimony whereof, I affix my signature hereto.

ALBIN PAULUS LOFSTRAND.